(12) United States Patent
Chen

(10) Patent No.: US 6,215,067 B1
(45) Date of Patent: Apr. 10, 2001

(54) COMMUNICATION LINE CONNECTING BOX WITH PIVOTED COVER

(75) Inventor: Michael Chen, Taipei (TW)

(73) Assignee: Surtec Industries Inc., Taipei (TW)

( * ) Notice: Subject to any disclaimer, the term of this patent is extended or adjusted under 35 U.S.C. 154(b) by 0 days.

(21) Appl. No.: 09/301,763

(22) Filed: Apr. 29, 1999

(51) Int. Cl.[7] .................................................. H02G 3/14
(52) U.S. Cl. ............................................. 174/66; 220/241
(58) Field of Search .................................. 174/66, 67, 55, 174/59; 220/241, 242; 439/404, 676, 535, 718; 379/312, 326, 327

(56) References Cited

U.S. PATENT DOCUMENTS

| | | | | |
|---|---|---|---|---|
| Re. 33,560 | * | 3/1991 | Rodgers | 379/329 |
| 2,880,264 | * | 3/1959 | Ruskin | 174/67 |
| 3,902,002 | * | 8/1975 | Smith | 174/151 |
| 4,313,039 | * | 1/1982 | DeLuca et al. | 379/327 |
| 4,712,232 | * | 12/1987 | Rodgers | 379/329 |
| 5,045,640 | * | 9/1991 | Riceman | 174/67 |
| 5,178,554 | * | 1/1993 | Siemon et al. | 439/188 |
| 5,280,135 | * | 1/1994 | Berein et al. | 174/67 |
| 5,454,733 | * | 10/1995 | Watanabe et al. | 439/540.1 |
| 5,649,829 | * | 7/1997 | Miller et al. | 439/76.1 |
| 5,763,827 | * | 6/1998 | Sugiura | 174/49 |
| 5,876,255 | * | 3/1999 | Oda et al. | 439/752 |

FOREIGN PATENT DOCUMENTS

2643186 * 10/1977 (DE) ................................. 379/326

* cited by examiner

*Primary Examiner*—Kristine Kincaid
*Assistant Examiner*—Dhiru R Patel
(74) *Attorney, Agent, or Firm*—Birch, Stewart, Kolasch & Birch, LLP

(57) ABSTRACT

A communication line connecting box for connecting communication lines, such as telecommunication wires or network lines, includes: a base; a cover hinged on the base; and a connector module installed in the cavity formed between the base and the cover. The cover can be swung to a position for exposure of the connector module by the user without using a tool. The user can easily connect the communication lines to the connecting box. There are some inlets formed on four sides and the bottom of the base for leading the lines to the connector module. The connecting box can further be attached with identification labels on the front surface of the cover for easier identification of the communication lines. The connecting box can be engaged on a supporting frame according to some mounting requirements. Therefore, a connecting box which is easy to use is provided.

11 Claims, 8 Drawing Sheets

COMMUNICATION LINE CONNECTING BOX WITH PIVOTED COVER

BACKGROUND OF THE INVENTION

The present invention generally relates to a connecting box for connecting communication lines such as telecommunication cables or network lines, and particularly to a connecting box which has a cover pivotally mounted thereon.

Along with the technical development of information communications, related peripherals are also developed. In the communication networks, data are connected and transferred via signal lines. Therefore, the line connecting devices play important roles. They transfer signals and data generated from kinds of facilities to their peripheral devices or clients, and make the information transferred far away without losing fidelity. Some connecting devices capable of installing different kinds of telecommunication connectors, such as phone jacks and punch-down connecting blocks, will improve their compatibility.

A conventional line connecting device is generally a box mounted therein many line connectors of certain kinds. For connecting communication lines to the device, the user has to first open the box (generally by unscrewing some fasteners to release a cover) in order to reach the connectors. Then the lines can be connected to some connecting terminals. When the connecting box is in a higher place, the user has to carefully place the cover and prevents it from falling and losing which will cause inconvenience of use.

SUMMARY OF THE INVENTION

The primary objective of the present invention is therefore to overcome the aforesaid drawbacks and provide a communication line connecting box which can be used without unscrewing a cover.

Another objective of the present invention is to provide a connecting box to which the communication lines can be easily installed.

A further objective of the present invention is to provide a connecting box to which some labels for identifying the lines can be easily applied.

According to the present invention, a communication line connecting box includes: a base; a cover hinged on the base; and a connector module installed in the cavity formed between the base and the cover. The cover can be swung to a position for exposure of the connector module by the user without using a tool. So the user can easily connect communication lines to the connecting box without needs of releasing the cover from the base by using tools.

There are further some inlets formed on four sides and the bottom of the base for leading communication lines to the connector module. Therefore, according to the condition of installation environment, the communication lines can be lead through the sideward inlets or the bottom inlets.

The connecting box according to the present invention can further be attached with identification labels on the front surface of the cover for easier identification of the communication lines.

Further, the cover of the connecting box according to the present invention can also be removed from the base by hand without using other tools, so as to be a convenient device for connecting the communication lines.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The above objectives and advantages of the present invention will become more apparent from the following detailed description and preferred embodiments thereof with reference to the attached drawings which are given by way of illustration only, and thus are not limitative of the present invention, and in which.

DETAILED DESCRIPTION OF PREFERRED EMBODIMENTS

Figure 1:
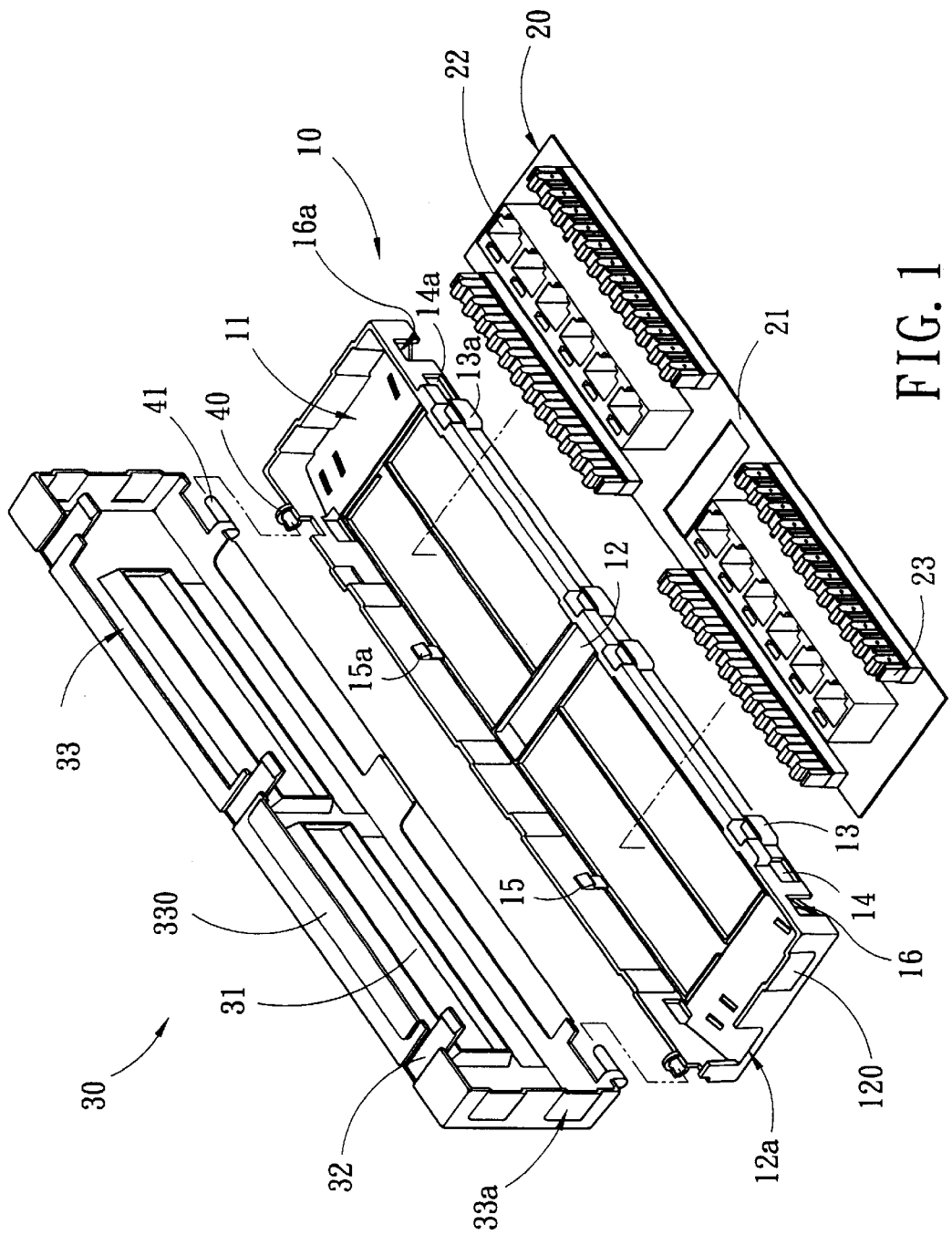
FIG. 1 is an exploded view of a connecting box according to the present invention.
Figure 2:
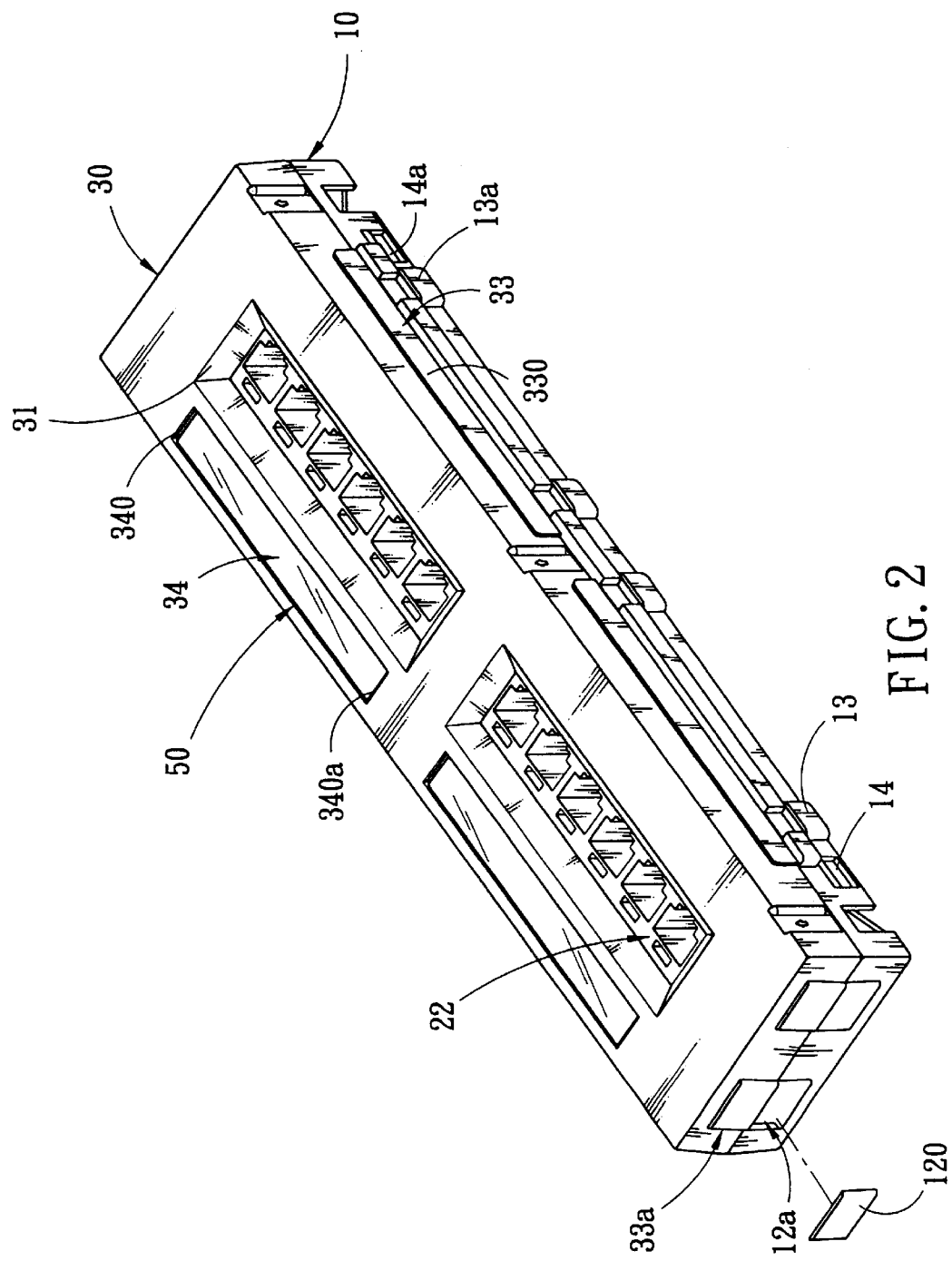
FIG. 2 is a perspective view of a connecting box according to the present invention.

As shown in FIG. 1 and FIG. 2, a communication line connecting box according to the present invention includes:

a base 10 which is a box formed with a cavity, an upward opening 11 and several inlets 12, 12a at the sides and the bottom for importing communication lines. Each of the inlets 12, 12a is originally covered by a tab 120 which is preferably formed as a removable portion from the box by a thin plate or partial links therewith, so it can be removed for importing the line, but maintains covering the base 10 if the tab is not used;

a connector module 20 capable of being installed in the cavity of the base 10 and grasped by several clamps 15, 15a formed on the inner wall of the base 10. The clamps 15, 15a can be pushed to release the connector module 20 from the base 10 if necessary. The connecting module 20 is for connecting the communication lines 80 (shown in FIGS. 6A, 6B etc.) to the desired terminals, such as phone jacks, of the communication facilities. As shown in the drawing, the connector module 20 includes a print circuit board (PCB) 21, and several phone jacks 22 and several push-down connecting blocks 23 mounted on the PCB 21. The communication lines 80 are connected to the connecting blocks 23. Through the PCB 21 and the phone jacks 22, the lines 80 are connected to some unshown phone plugs plugged in the phone jacks 22 and activate the communications;

a cover 30 for covering the opening 11 of the base 10. At least an inlet 31 is formed on the cover 30 to expose the phone jacks 22 for receiving the unshown phone plugs. Several fasteners 32, such as hooks as shown, are formed on one side of the cover 30 for engagement with corresponding receptacles 16, 16a formed on the base 10 to fasten the two. The fasteners 32 can be forced and released from the base 10. At least a hinge composing of a shaft 41 and a bearing 40 formed respectively on the cover 30 and the base 10 links the two in a pivotal manner. So that the cover 30 can be swung by the hinge, as shown in FIG. 4, to expose the connector module 20 for line connection when the fasteners 32 are released; and at least an identification label 50 for writing or printing, which is made of a sheet of paper, film or similar material, and capable of mounting on the front surface of the cover 30 for identifying the connecting positions of the communication lines 80. One implementation for mounting the label 50 is to form a sinkage 34 on the cover 30 which has two receiving holes 340, 340a for receiving the ends of the label 50 and fixing the label therein. There is further a protection sheet 51 made of transparent plastic, also fixed into the receiving holes 340, 340a, for covering the label 50 to prevent it from loss or damage.

Some other modifications for the implementation of the aforesaid members are as follows.

Figure 3:
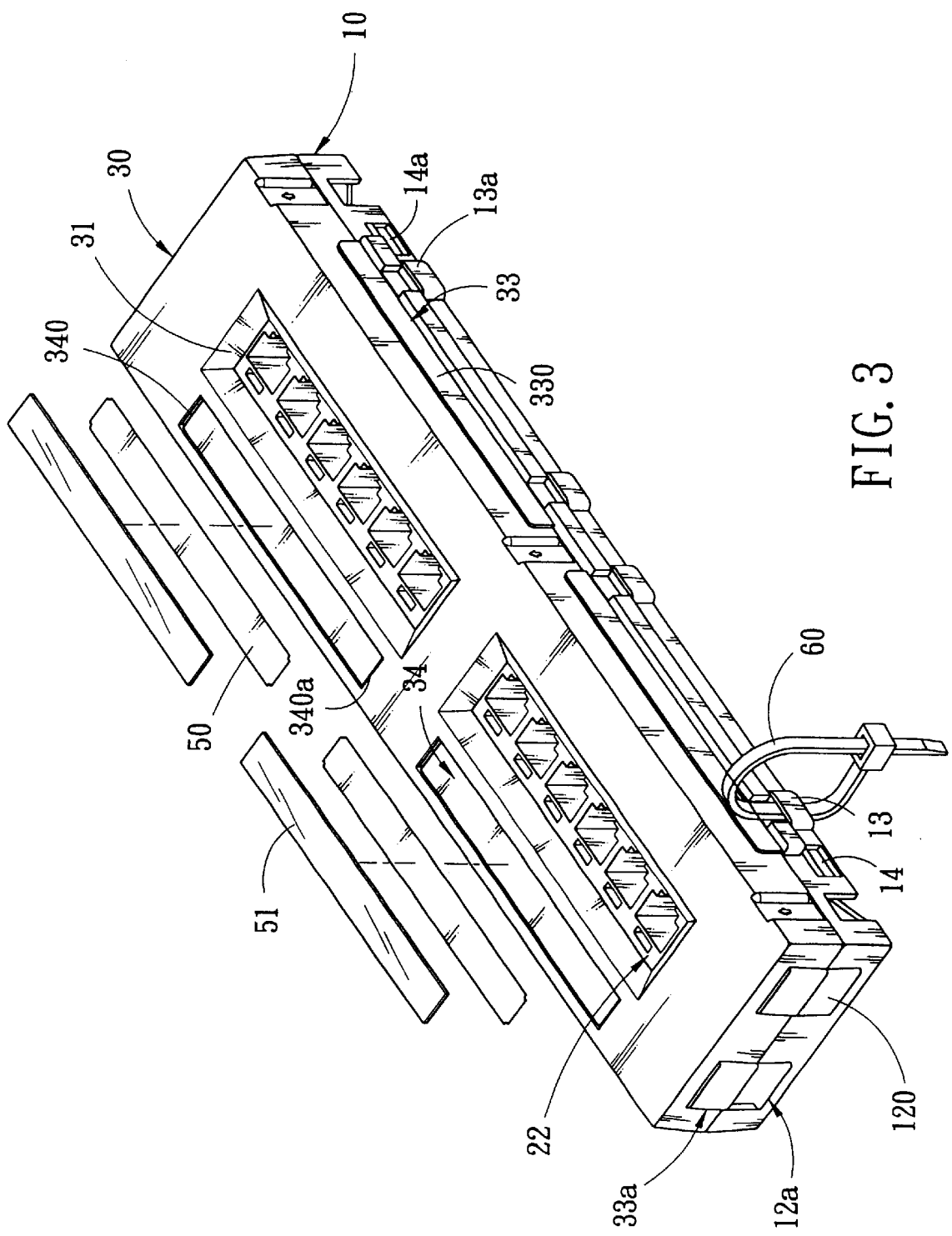
FIG. 3 is a partial exploded view of a connecting box according to the present invention.

First, several rings 13, 13a can be formed on the outer surface of the base 10 for some cable ties 60 to pass through, as shown in FIG. 3, and fixing the communication lines 80 to the base 10.

Second, on some suitable positions on the side walls of the base 10, several engagement holes 14, 14a are formed for fastening the connecting box to a supporting frame 70 when the connecting box is required to be lifted higher from the surface where the frame 70 is mounted according to some mounting requirements. The engagement portions 14, 14a are detachably engaged with hooks 71, 71a formed on the supporting frame 70.

The cover 30 is similar to the base 10 and formed with a cavity, a downward opening and several inlets 33, 33a at the sides for importing communication lines 80. Each of the inlets 33, 33a is originally covered by a tab 330 which is preferably formed as a removable portion from the cover 30 by a thin plate or partial links therewith, so it can be removed for importing the lines, but maintains covering the cover 30 if the tab 330 is not used (see FIG. 2).

Figures 4A, 4B:
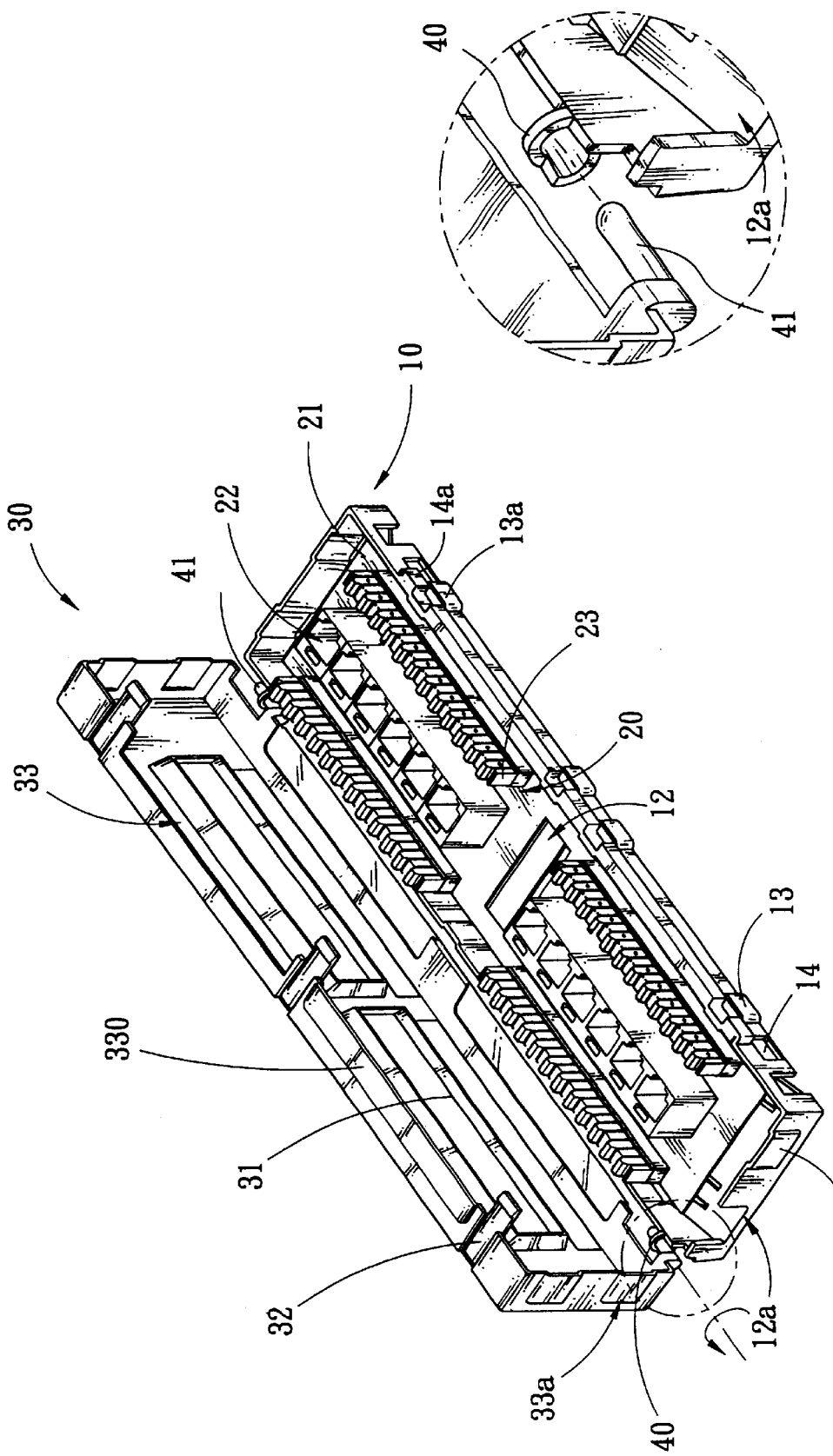
FIG. 4A is a perspective view of a connecting box according to the present invention showing the cover in an open position.
FIG. 4B is a partial enlarged view of the pivotal portion of a connecting box according to the present invention.
Figure 5:
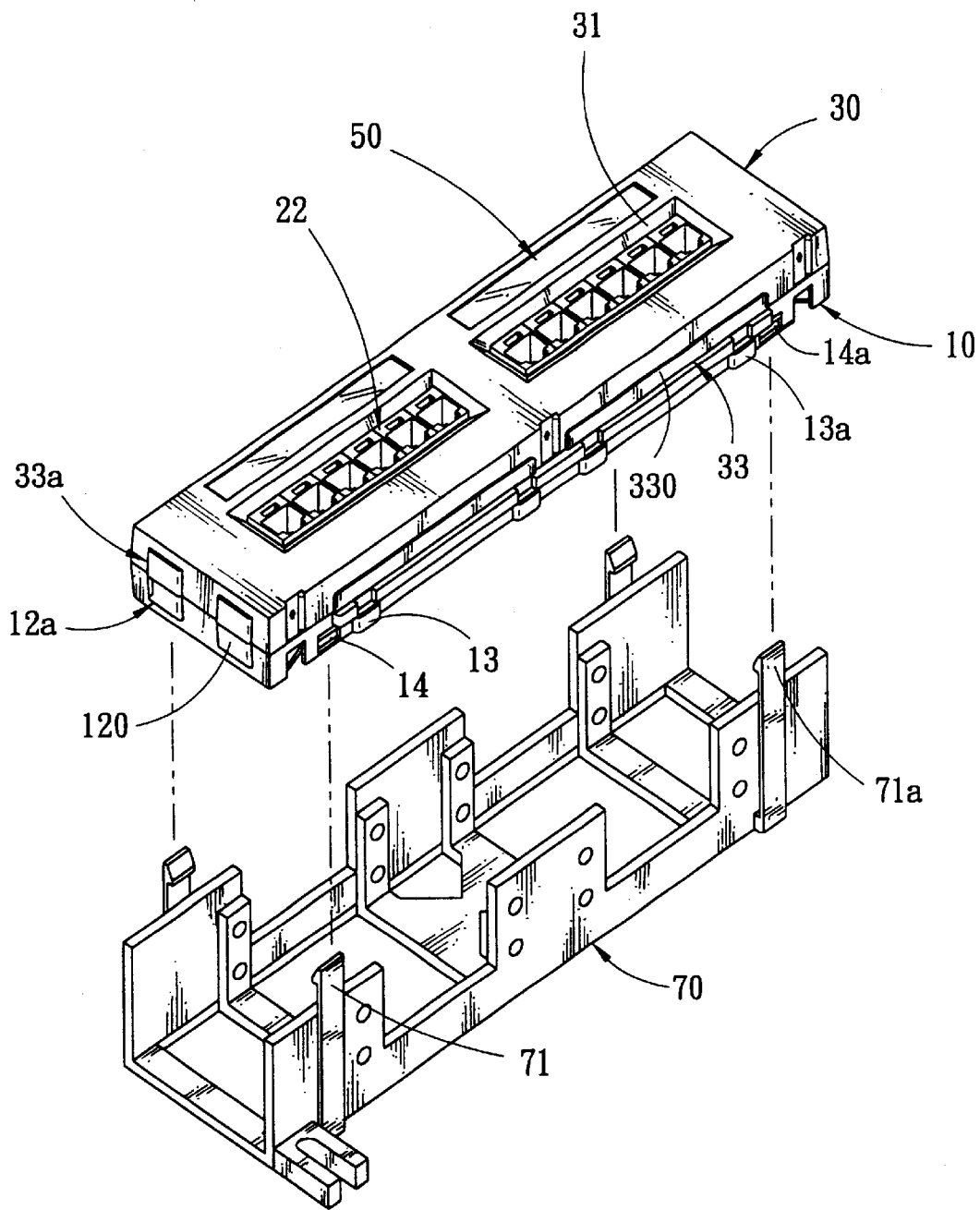
FIG. 5 is a descriptive view showing an example of using the connecting box of the present invention along with a supporting frame.

The hinges according to the present invention are preferably formed in the following manner. The shafts 41 are preferably inserted into the bearings 40 from a same direction. The axes of the shafts 41 are preferably bias to the axes of the bearings 40, so upon the shafts 41 inserting into the bearings 40, interferences are generated to prevent the shafts 41 from loosing from the bearings 40. But they can be released, as shown in FIG. 4B, without using tools when a certain force applies on them.

Figures 6A, 6B:
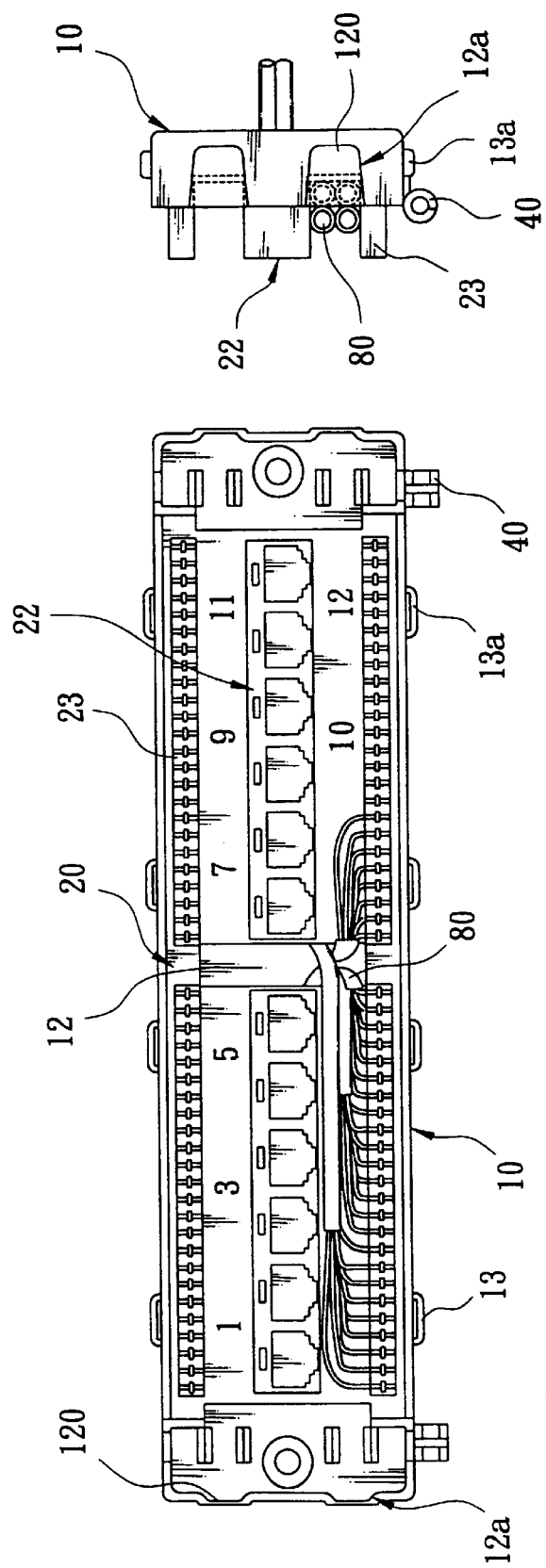
FIG. 6A is a front view of an example of using the connecting box of the present invention by importing the lines from some bottom inlets.
FIG. 6B is a side view of the example of FIG. 6A.
Figures 7A, 7B:
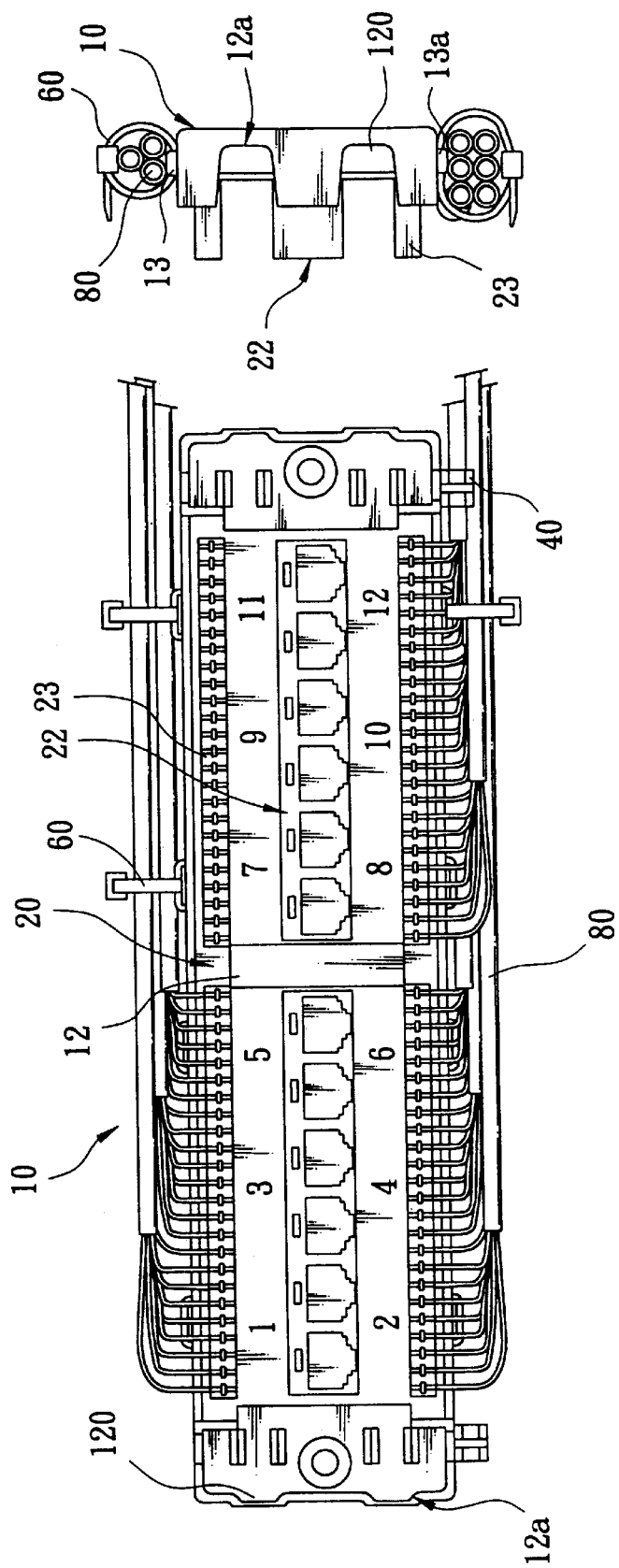
FIG. 7A is a front view of another example of using the connecting box of the present invention by importing the lines from upper and lower side inlets.
FIG. 7B is a side view of the example of FIG. 7A.
Figure 8A:
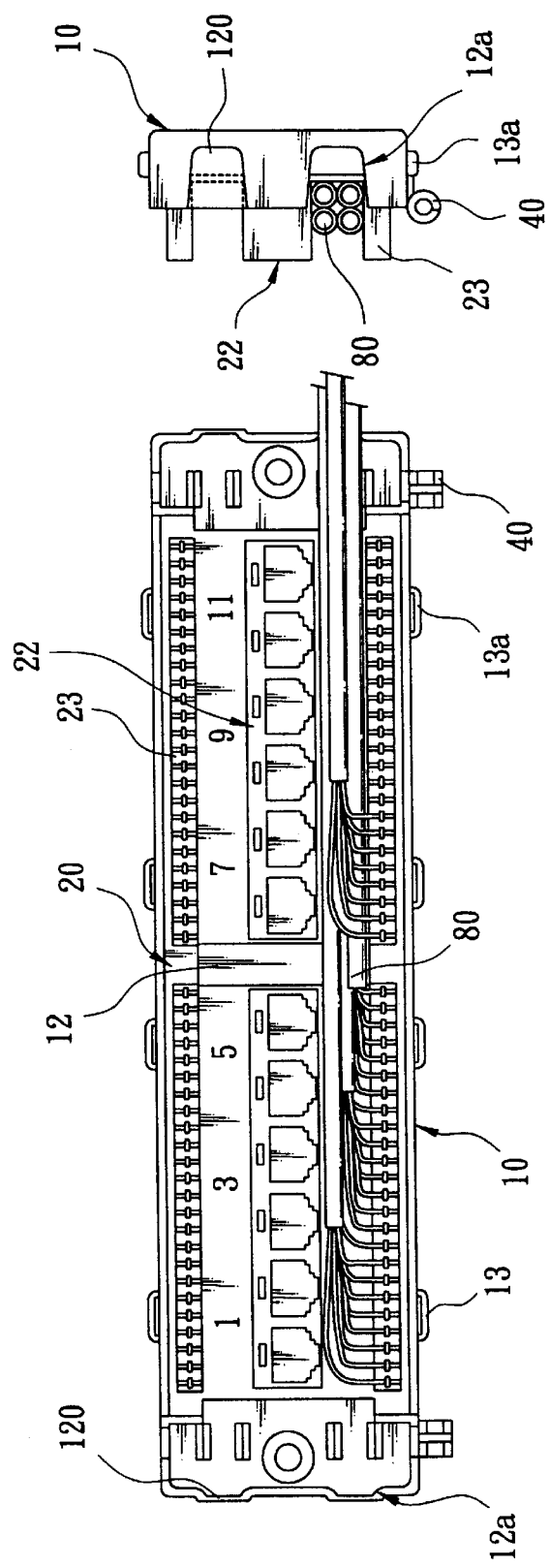
FIG. 8A is a front view of still another example of using the connecting box of the present invention by importing the lines from the left and right side inlets.
Figure 8B:
FIG. 8B is a side view of the example of FIG. 8A.

When using the connecting box of the present invention, the communication lines 80 can be selectively lead in from the side walls or from the bottom of the base 10. As shown in FIGS. 6A and 6B, the communication lines 80 are lead into the connecting box through an inlet 12 at the bottom of the base 10. In FIGS. 7A and 7B, the communication lines 80 are lead through inlets 12 on the upper and lower sides of the base 10 and fastened by cable ties 60. And, in FIGS. 8A and 8B, the communication lines 80 are lead through inlets 12 on the left and right sides of the base 10.

It is to be understood that the drawings are designed for purposes of illustration only, and are not intended as a definition of the limits and scope of the invention disclosed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A connecting box with hinged cover for connecting communication lines via punch-down connecting blocks and phone jacks, comprising:

a base formed as a box having an upward opening, and at least one inlet formed thereon for importing said communication lines, a connector module, installed in said box, having several push-down connecting blocks and corresponding phone jacks, for connecting said communication lines;

a cover for covering said upward opening of said box, and formed with at least one inlet to expose said phone jacks for connection, at least one fastener is formed on one side of said cover for fastening said cover with said base;

a pair of hinges, each comprising a bearing and a shaft formed respectively on said base and said cover, for pivoting said cover to an open position when said fastener of said cover is released from said base; and identification labels, formed with writable material and detachably fixed on said cover for users to identify positions of said communication lines.

2. The connecting box with hinged cover as recited in claim 1 wherein said inlet of said base is formed on side walls of said box for importing said communication lines into said box from said side walls.

3. The connecting box with hinged cover as recited in claim 1 wherein said inlet of said base is formed on bottom of said box for importing said communication lines into said box from said bottom.

4. The connecting box with hinged cover as recited in claim 1 wherein said inlet of said base is accompanied with a tab for covering said inlet in a movable manner in order to be removed before use.

5. The connecting box with hinged cover as recited in claim 1 wherein said base is further furnished with several rings on side walls thereof for fixing said communication lines to said base with cable ties passing through.

6. The connecting box with hinged cover as recited in claim 1 wherein said cover is furnished with at least a second inlet for importing said communication lines.

7. The connecting box with hinged cover as recited in claim 6 wherein said second inlet of said cover is formed on side walls of said cover and corresponding to said at least one inlet of said base for importing said communication lines into said box from said side walls.

8. The connecting box with hinged cover as recited in claim 6 wherein said second inlet of said cover is accompanied with a covering plate for covering said second inlet in a movable manner in order to be removed before use.

9. The connecting box with hinged cover as recited in claim 1 wherein said cover is furnished with a sinkage having two receiving holes for receiving ends of said label and fixing said label therein.

10. The connecting box with hinged cover as recited in claim 1 wherein said shafts of said pair of hinges are inserted into said bearings in a same direction so as to enable the user to remove said cover from said base without using a tool.

11. The connecting box with hinged cover as recited in claim 10 wherein the axes of said shafts are biased to the axes of said bearings, so upon said shafts inserting into such bearings, interferences are generated to prevent said shafts from loosening from the bearings in use, but can be released without using tools when a predetermined force is applied thereon.

* * * * *